Nov. 5, 1940.                H. O. HEM                2,220,679
                           WEIGHING SCALE
                        Filed April 20, 1939         3 Sheets-Sheet 1
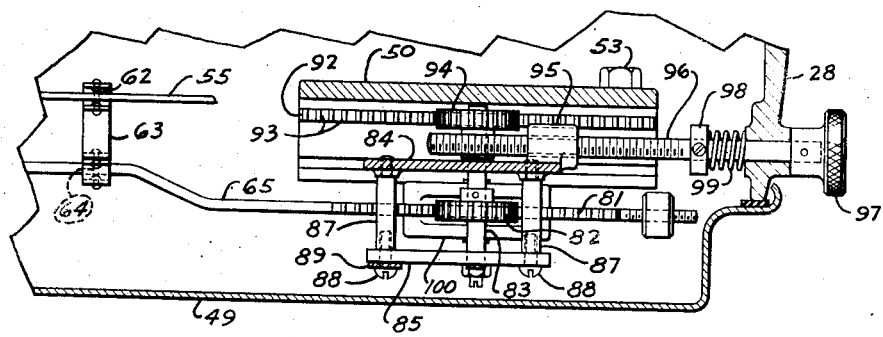
Fig. V
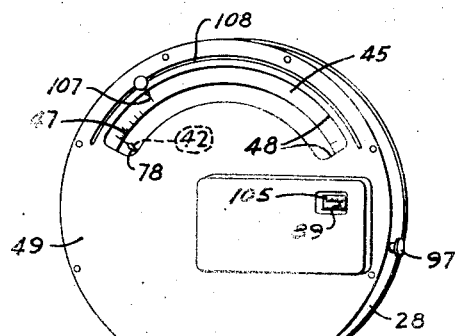
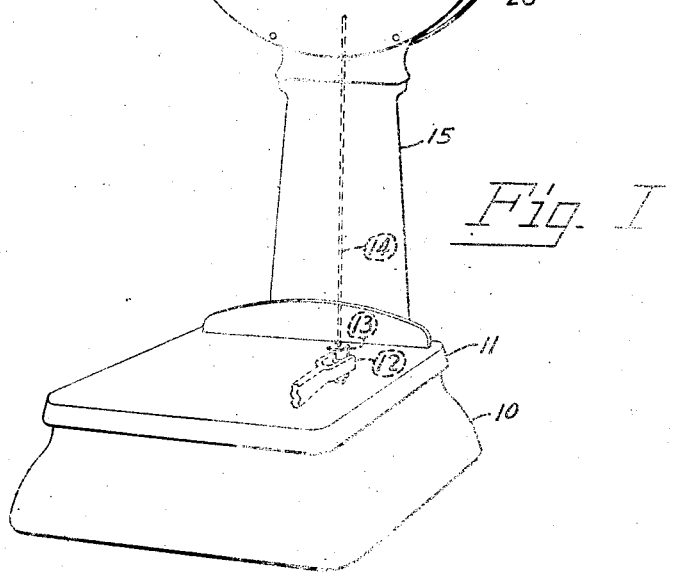
Fig. I
Halvor O. Hem
INVENTOR
BY Marshall & Marshall
ATTORNEYS

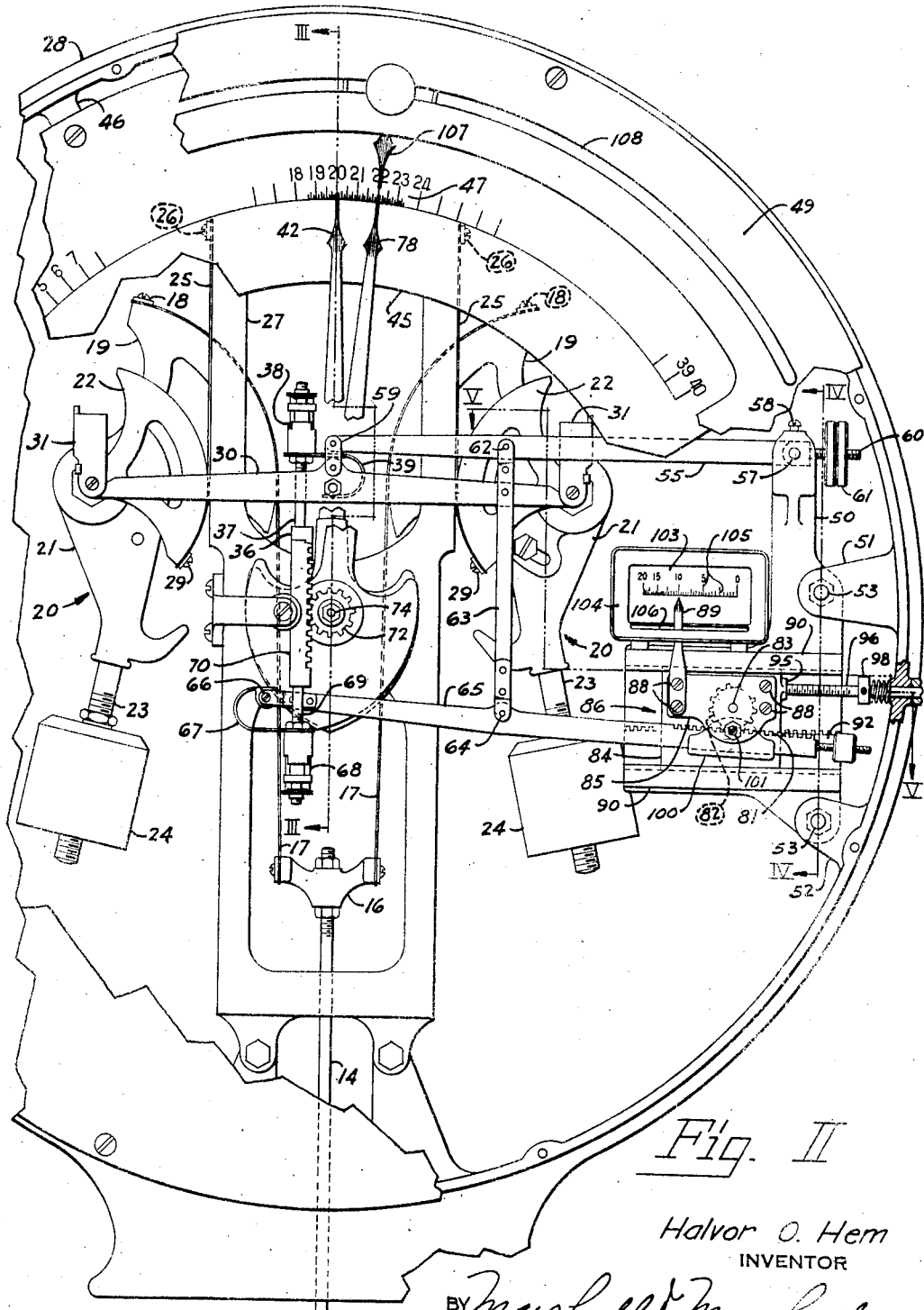
Fig. II
Halvor O. Hem
INVENTOR
BY Marshall & Marshall
ATTORNEYS

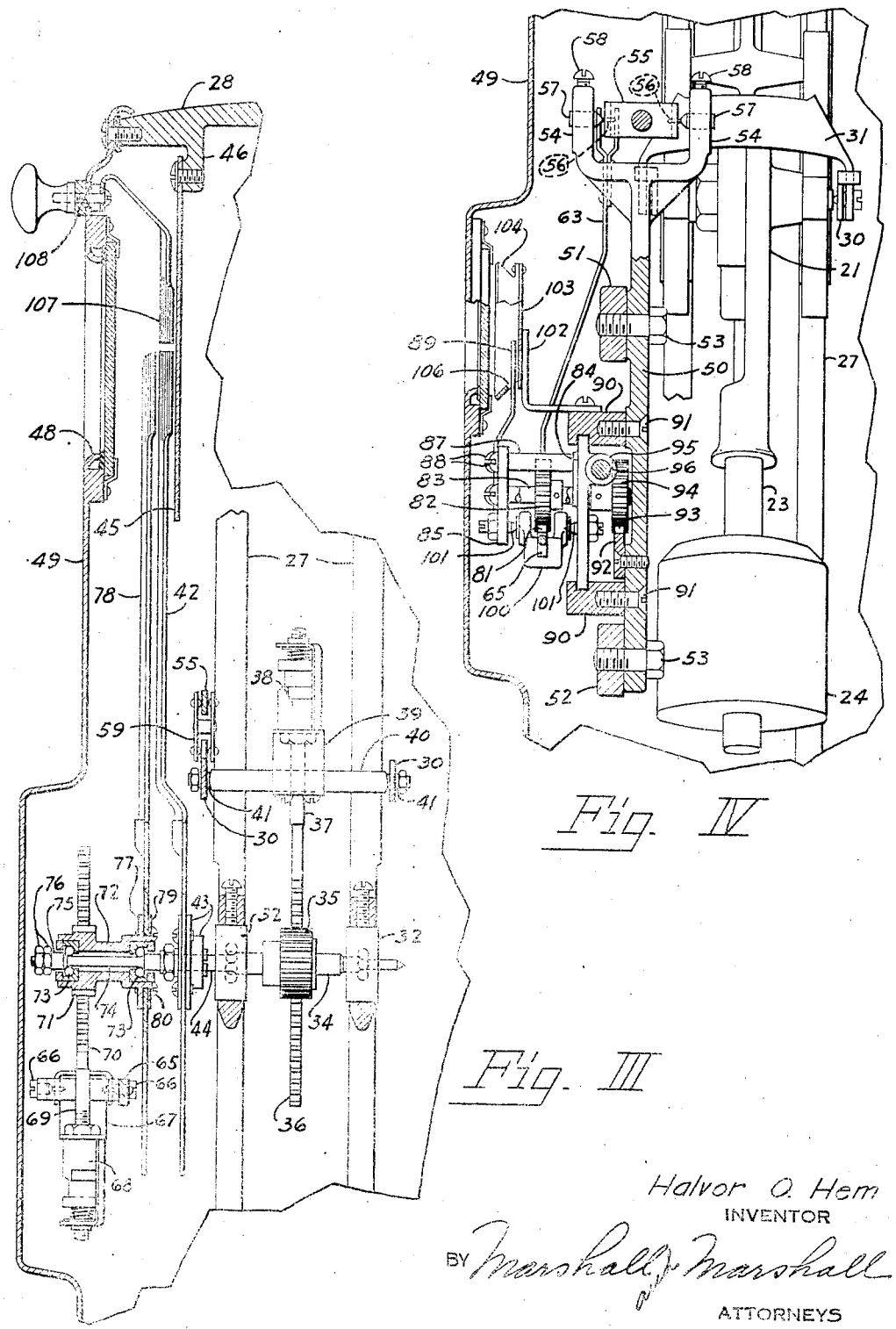

Patented Nov. 5, 1940

2,220,679

UNITED STATES PATENT OFFICE 2,220,679

WEIGHING SCALE

Halvor O. Hem, Toledo, Ohio, assignor to Toledo Scale Company, a corporation of New Jersey Application April 20, 1939, Serial No. 268,908

10 Claims. (Cl. 265—29)

This invention relates generally to weighing scales, and more particularly to weighing scales which are adapted to determine a percentual increase in the weight of a load. Cuts of meat, such as hams, sides of bacon, etc., are now preferably cured by pumping or injecting pickling brine into the vascular system or into the cells of the meat directly by means of perforated needles and then finishing the cure by immersing in pickling brine. The brine which is pumped into the cells reduces the time of immersion in the pickling brine considerably and tends to distribute brine evenly throughout the entire cut; however, it is essential that the amount of brine pumped into the cut be in definite relation to the weight of the cut and accurately determined.

The principal object of this invention is the provision of improved weighing means for determining the weight of an unimpregnated cut of meat and for determining when the desired percentual amount of brine has been injected into the cut.

Another object is the provision of improved means whereby two indicators are provided, one of said indicators being adapted to automatically indicate the net weight of a cut of meat and the other of said indicators being adapted to indicate the weight of the meat plus a percentual addition of pickling brine.

Another object is the provision of improved means whereby one of said indicators is automatically moved at a percentually greater rate; and, Still another object is the provision of a manually set indicator for cooperation with said automatically actuated indicators.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is a perspective view of a scale embodying the invention.

Fig. II is an enlarged, fragmentary front elevational view of the counterbalancing mechanism and the indicator means.

Fig. III is a fragmentary cross-sectional view substantially along the line III—III of Fig. II.

Fig. IV is a cross-sectional view along the line IV—IV of Fig. II; and,

Fig. V is a cross-sectional view along the line V—V of Fig. II.

Referring to the drawings in detail:

The scale comprises a base 10 containing the usual load lever system upon which a platform 11 is pivotally supported. A nose 12 of this lever system pivotally engages a stirrup 13 on the lower end of a rod 14 which extends vertically upwards in the interior of a column 15 fixed to a projecting deck of the base 10. The upper end of this rod 14 is adjustably clamped to an equalizer 16 (Fig. II), secured to the lower ends of flexible metallic ribbons 17. The upper ends of these ribbons 17 overlie and are fastened at 18 to arcuate faces of power sectors 19 of load counterbalancing pendulums 20. Each of these pendulums comprises, in addition to the power sectors 19, a body 21, a pair of fulcrum sectors 22, a pendulum stem 23 which is studded into the body 21, and a pendulum weight 24 threaded upon the stem 23. These pendulums are fulcrumed on flexible metallic ribbons 25 whose upper ends are fastened at 26 to a sector guide 27 suitably positioned in the interior of a substantially watchcase-shaped housing 28 which surmounts the column 15. The lower ends of these ribbons are clamped at 29 to the lower ends of arcuate faces of the fulcrum sectors 22. Compensating bars 30 and yokes 31, pivotally connected to the pendulums at their centers of revolution, are provided to prevent these pendulums from disengaging from the sector guide 27 when the scale is in slightly out-of-level position.

Antifriction ball bearings 32 (Fig. III), seated in horizontally extending flanges of the sector guide 27, support an indicator shaft 34 upon which a pinion 35 is circumjacently mounted. The teeth of this pinion 35 mesh with the teeth of a rack 36 fixed in the lower end of a threaded rod 37, adjustably held in a member 38, fastened to one arm of a resilient U-shaped member 39 which is fastened to a square shaft 40 having turned down trunnion ends 41, which are supported in suitable apertures in the compensating bars 30. These apertures are located centrally between the ends of the bars.

To indicate the weight of a load on the platform 11, an indicator 42 is clamped, by means of a hub 43, to a portion 44 of the shaft 34 which projects through the ball bearing 32 on the front of the scale. This indicator 42 is adapted to cooperate with a chart 45 fastened to bosses 46 in the interior of the housing 28 immediately in back of the indicator 42 and this chart 45 is provided with a series of weight indicia 47 which, together with a portion of the indicator 42, are visible through a glazed opening 48 in a suitably formed, substantially circular housing cover plate 49 securely fastened to the front face of the housing 28.

The scale thus far described is well adapted to determine and indicate weights of loads placed on the platform 11. When such a load is placed on this platform 11 its "pull" is transmitted through the lever nose 12, the stirrup 13, rod 14, equalizer 16, ribbons 17 to the pendulums 20 and their weights 24 move outwardly and upwardly counterbalancing the "pull" in the well known manner. The upward movement of the pendulums, through the compensating bars 30, is transmitted to the rack 36 which in turn causes the pinion 35, fixed on the shaft 34, to rotate and the indicator 42, which is clamped to this shaft 34, cooperates with the indicia 47 on the chart 45 to indicate the weight.

To accomplish the object of the instant invention auxiliary mechanism is supported upon a bracket 50 secured to bosses 51 and 52 in the interior of the housing 28, by means of bolts 53. The upper end of the bracket 50 is bifurcated and between the arms 54 of this bifurcation a light, rigid lever 55 is antifrictionally mounted upon hardened and ground tenons 56 of fulcrum studs 57 which are adjustably seated in apertures in the arms 54 and locked by means of screws 58. The opposite end of this lever pivotally engages one end of a short link 59 whose other end pivotally engages one of the compensating bars 30. So that this lever and cooperating parts depending therefrom may be conveniently balanced about its fulcrum, the end adjacent the fulcrum is provided with a short studded shaft 60 upon which a counterbalance weight 61 is adjustably threaded. The weight 61 is made in two parts so that the two parts may be tightly screwed against each other to prevent a shift in their position upon the threaded shaft 60.

In spaced relation to the fulcrum pins 57 the lever 55 is provided with a laterally extending pivot pin 62 from which a formed hanger 63, having forked ends, is suspended, the lower forked end of this hanger 63, by means of a pin 64, supports an automatic percentage indicator actuating lever 65. The end of this lever 65, located near the center of the scale, is also forked and from the arms of this fork a resilient substantially U-shaped member 67 is suspended, by means of suitable pivot pins 66. The legs of the U-shaped member 67 are unequal, the short leg being provided with ears engaged by the pivot pins 66, while the other longer leg has secured to it a rackfoot 68 which adjustably supports a rod 69 to whose upper end a rack 70 is secured. The teeth of the rack 70 engage the teeth 71 of a pinion 72, the ends of which are provided with ball bearings 73. This pinion 72 is mounted for rotation upon another portion 74 of the indicator shaft 34. To prevent longitudinal displacement of the pinion 72 a thrust member 75 is circumjacently mounted upon the portion 74 and retained in position by nuts 76. The inner end of this pinion is also provided with a disk-like hub 77 to which an automatically actuated percentage indicator 78 is clamped by means of a clamping ring 79 and screws 80.

The upper edge of the opposite end of the percentage indicator actuating lever 65 is provided with a series of teeth 81 which engage teeth of a pinion 82. This pinion 82 is fixedly mounted upon a shaft 83 seated in bores in sides 84 and 85 of a sliding carriage 86. This sliding carriage 86 comprises, in addition to the sides 84 and 85, spacers 87. One end of these spacers 87 is studded into the side 84 and the side 85, being secured thereto by means of the screws 88. Two of the screws 88 also retain a percentage indicator 89 which is thus clamped to the outer face of the side 85. The purpose of this indicator will later become clear. The side 84 is mounted for sliding movement in grooves in guide bars 90 which are clamped in proper relation to each other to finished surfaces on the side of the bracket 50 by means of countersunk head screws 91. Immediately above the lower guide bar 90, and bolted to a continuation of the finished surface, is a rack bar 92, the upper edge of which is equipped with teeth 93. These teeth have the same pitch as the teeth 81 on the upper edge of the lever 65 and the pitch line of the teeth 93 lie in the same plane as the pitch line of the teeth 81 when the lever 65 is in a horizontal position. The teeth 93 of the rack bar 92 engage teeth of a pinion 94 which is secured to that portion of the shaft 83 projecting beyond the side 84. The side 84 of the sliding carriage 86 is further provided with a laterally extending, substantially circular boss 95 through which a rod 96 is threaded. This rod extends through an aperture in the side of the housing 28. The end is provided with a hand knob 97 so that it may be turned, it is prevented from longitudinal movement by a collar 98 and a spring 99 which is interposed between this collar 98 and a boss on the inner surface of the housing wall. The purpose of this threaded rod 96 and hand knob 97 is to enable the operator to shift the sliding carriage 86 in the grooves in the guide bars 90.

One end of the lever 65 rests in a guide 100 which, by means of conical pivots 101 extending through the sides 84 and 85, is pivotally suspended from the sliding carriage 86 in such a manner that the pitch line of the teeth 81, the pitch circle of the pinion 82 and the turning axis of the guide 100 lie in a plane so that the lever 65 may oscillate about an axis formed by the pitch circle of the pinion 82.

Screwed to the upper face of the upper guide bar 90 are two L-shaped brackets 102, a flat plate 103 provided with a bezel 104 is riveted to the perpendicular legs of the brackets 102. The plate 103 is provided with a series of percentage graduations and designating indicia 105 for cooperation with the percentage indicator 89 which projects upwardly through a slot 106 in the lower side of the bezel 104.

It was hereinbefore stated that the primary object of this invention is the improved means for determining the weight of a cut of meat and then automatically determining when a desired percentual amount of brine has been pumped into this cut. To attain the objects of the invention, after ascertaining the amount of brine which is to be added to a cut of meat, which for example let us assume is 10%, the operator, by means of the hand knob 97 turns the threaded rod 96 moving the slidable carriage 86 until the indicator 89 points to the indicium 10 in the series 105 on the plate 103. The relative movement of the carriage 86 and the rack 92 rotate the pinion 94, the shaft 83 and the pinion 82. Since the teeth of the rack 82 mesh with the teeth 81 of the lever 65 the guide 100 is moved relative to the lever 65 without changing the initial position of this lever 65, when there is no load on the platform, and since this lever 65 is statically balanced about its fulcrum on the pin 64 the weight moment of the lever 65 acting upon the statically balanced lever 55 is not changed and, therefore, the balance of the scale is not disturbed.

After the indicator 89 has been set, the operator places a ham, for example, upon the platform 11 of the scale. In the known manner the pendulums 20 will act to counterbalance the weight of this load and the indicator 42 will be actuated through the means described to indicate this weight which, in this example, we will assume is 20 pounds. The upward movement of the compensating bars 36, through the link 59, will cause the lever 55 to rotate in a clockwise direction about its pivots 56 and the hanger 63 will exert an upward "pull" upon the fulcrum pin 64 of the lever 65 causing the rack 70, which is suspended from its end, to rotate the pinion 72 and the thereto attached indicator 78. Since, however, the lever 65 bears against the pinion 82 which has been adjusted by the operator to a position so that the arms of the lever 65, between the pinion and the fulcrum pin 64 and the pinion and the pitch line of the rack 70 will cause the indicator 78 to rotate through an angle exactly 10% greater than the angle of displacement of the indicator 42. The indicator 78 will therefore indicate the total weight of the ham on the platform and the weight of the brine which is to be pumped therein. The total weight in this example is 22 pounds. When this has been determined, and the scale has come to rest, the operator manually moves an indicator 107 positioned in a radial slot 109 in the plate 49 until it coincides with the position of the indicator 78. This indicator 107 may be constructed as desired so long as means are provided for positively positioning and holding it in adjusted position. After the manually actuated indicator 107 has been set to the total weight of the ham and the desired amount of brine, the operator injects brine into the ham or other cut of meat and continues to do so until the indicator 42 comes into registration with the indicator 107. When this position is reached by the indicator 42 exactly 10% of brine calculated on the weight of the meat has been added to the ham.

From the foregoing it will be seen that the graduations of the series 105 determine the position of the pinion 82 in which the ratio of the lengths of the arms of the lever 65, that is between its contact point with the pinion 82 and the fulcrum pin 64, and between its contact point with the pinion 82 and the pitch line of the rack 72, is such so as to rotate the indicator 78 through an angle that is greater the percentual amount indicated by the designating indicia, than the angle of rotation of the indicator 42. The position for each of the graduations in the series 105 can thus be readily calculated.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, weighing mechanism including an indicator adapted to be rotated by said weighing mechanism, a second indicator coaxially mounted with said first indicator, mechanism for rotating said second indicator in response to movement of said weighing mechanism at a different rate than that of said first indicator, said mechanism including a lever fulcrumed at one end, means for connecting the other end of said lever to said weighing mechanism, a second lever operatively fulcrumed on said first lever, a rack and pinion connection between one end of said second lever and said second indicator and an adjustable contact axis for the other end of said second lever, said adjustable contact axis comprising a series of rack teeth on said second lever, stationary guide bars, a carriage slidable along said guide bars, a rack fixedly secured to one of said guide bars, the teeth of said rack secured to said guide bar being in horizontal alignment with the rack teeth on said second lever when said second lever is in a horizontal position, a pinion shaft rotatably mounted in said sliding carriage, a plurality of pinions fixed on said pinion shaft and spaced so that the teeth of said pinions simultaneously engage certain teeth on said second lever and certain teeth of said rack secured to said guide bar, manually actuated means for longitudinally moving said sliding carriage to rotate said pinions into engagement with other teeth on said second lever and on said rack secured to said guide bar and said means for moving said carriage comprising a member adjustably threaded into said sliding carriage, means for preventing longitudinal displacement of said threaded member and means comprising a hand knob for rotating said threaded member.

2. In a device of the class described, in combination, weighing mechanism including an indicator adapted to be rotated by said weighing mechanism, a second indicator coaxially mounted with said first indicator, mechanism for rotating said second indicator in response to movement of said weighing mechanism at a different rate than that of said first indicator, said mechanism including a lever fulcrumed at one end, means comprising a link for connecting the other end of said lever to said weighing mechanism, a second lever operatively fulcrumed on said first lever, a rack and pinion connection between one end of said second lever and said second indicator and an adjustable contact axis for the other end of said second lever, said adjustable contact axis comprising a series of rack teeth on said second lever, stationary guide bars, a carriage slidable along said guide bars, a rack fixedly secured to one of said guide bars, the teeth of said rack secured to said guide bar being in horizontal alignment with the rack teeth on said second lever when said second lever is in a horizontal position, a pinion shaft rotatably mounted in said sliding carriage, a plurality of pinions fixed on said pinion shaft and spaced so that the teeth of said pinions simultaneously engage certain teeth on said second lever and certain teeth of said rack secured to said guide bar, manually actuated means for longitudinally moving said sliding carriage to rotate said pinions into engagement with other teeth on said second lever and on said rack secured to said guide bar and a relatively movable chart and indicator fixed to one of said guide bars and said sliding carriage.

3. In a device of the class described, in combination, weighing mechanism including an indicator adapted to be rotated by said weighing mechanism, a second indicator coaxially mounted with said first indicator, mechanism for rotating said second indicator in response to movement of said weighing mechanism at a different rate than that of said first indicator, said mechanism including a lever fulcrumed at one end, means comprising a link for connecting the other end of said lever to said weighing mechanism, a second lever operatively fulcrumed on said first lever, a rack and pinion connection between one end of said second lever and said second indicator and an adjustable contact axis for the other end of said second lever, said adjustable contact axis comprising a series of rack teeth on said second lever, stationary guide bars, a carriage slidable along said guide bars, a rack fixedly secured to one of said guide bars, the teeth of said rack secured to said guide bar being in horizontal alignment with the rack teeth on said second lever when said second lever is in a horizontal position, a pinion shaft rotatably mounted in said sliding carriage, a plurality of pinions fixed on said pinion shaft and spaced so that the teeth of said pinions simultaneously engage certain teeth on said second lever and certain teeth of said rack secured to said guide bar and manually actuated means for longitudinally moving said sliding carriage to rotate said pinions into engagement with other teeth on said second lever and on said rack secured to said guide bar.

4. In a device of the class described, in combination, load weighing mechanism, load indicating means operatively connected to said load weighing mechanism, said load indicating means including a shaft, antifriction bearings for supporting said shaft, an indicator fixedly mounted upon said shaft, operating connections between said load weighing mechanism and said shaft, additional means for automatically indicating the weight of such load plus a predetermined fraction of such load, said additional indicating means including an indicator, a hub on said indicator, gear teeth on said hub, antifriction bearings in said hub, said antifriction bearings being mounted on the shaft of said first mentioned indicator for independent rotation thereon and means actuated by said load weighing mechanism for actuating said second indicator, said means for actuating said second indicator comprising a counterbalanced lever, a link between said load weighing mechanism and said counterbalanced lever, a second lever operatively fulcrumed on said first mentioned counterbalanced lever, a rack and pinion between said second lever and said second indicator and means for varying the ratio of the lever arms of said second lever.

5. In a device of the class described, in combination, load weighing mechanism, load indicating means operatively connected to said load weighing mechanism, said load indicating means including a shaft, antifriction bearings for supporting said shaft, an indicator fixedly mounted upon said shaft, operating connections between said load weighing mechanism and said shaft, additional means for automatically indicating the sum of the weight of such load plus a predetermined fraction of such load, said additional indicating means including an indicator, a hub on said indicator, gear teeth on said hub, antifriction bearings in said hub, said antifriction bearings being mounted on the shaft of said first mentioned indicator for independent rotation thereon and means actuated by said load weighing mechanism for actuating said second indicator, said means for actuating said second indicator comprising a counterbalanced lever, a link between said load weighing mechanism and said counterbalanced lever, a second lever operatively fulcrumed on said first mentioned counterbalanced lever and connections between said second lever and said second indicator.

6. In a device of the class described, in combination, weighing mechanism including an indicator adapted to be rotated by said weighing mechanism, a second indicator coaxially mounted with said first indicator, mechanism for rotating said second indicator in response to movement of said weighing mechanism, said mechanism including a lever fulcrumed at one end, a link for connecting the other end of said lever to said weighing mechanism, a hanger suspended from said lever, a second lever, a fulcrum for supporting said second lever on said hanger, a rack and pinion connection between one end of said second lever and said indicator, an adjustable contact axis for the other end of said second lever whereby the ratio of the arms of said second lever is adjustable so as to cause said second indicator to rotate at a rate percentually greater than that of said first indicator, said adjustable contact axis being formed by a pinion, means including a threaded member for adjusting the position of said pinion relative to said fulcrum of said second lever, a guide for guiding that end of said second lever engaging said adjustable pinion and said guide being pivoted in coincidence with such contact axis formed by said pinion.

7. In a device of the class described, in combination, weighing mechanism including an indicator adapted to be rotated by said weighing mechanism, a second indicator mounted coaxially with said first indicator, mechanism for rotating said second indicator in response to movement of said weighing mechanism, said mechanism including a lever fulcrumed at one end, link connecting the other end of said lever to said weighing mechanism, a hanger suspended from said lever, a second lever, a fulcrum for supporting said second lever on said hanger, a rack and pinion connection between one end of said second lever and said indicator, an adjustable contact axis for the other end of said second lever whereby the ratio of the arms of said second lever is adjustable so as to cause said second indicator to rotate at a rate percentually greater than that of said first indicator, said adjustable contact axis being formed by the pitch circle of a pinion, means including a threaded member for adjusting the position of said pinion relative to said fulcrum of said second lever and a guide for guiding that end of said second lever engaging said adjustable pinion.

8. In a device of the class described, in combination, weighing mechanism including an indicator adapted to be rotated by said weighing mechanism, a second indicator mounted coaxially with said first indicator, mechanism for rotating said second indicator in response to movement of said weighing mechanism, said mechanism including a lever fulcrumed at one end, means connecting the other end of said lever to said weighing mechanism, a hanger suspended from said lever, a second lever, a fulcrum for supporting said second lever on said hanger, a rack and pinion connection between one end of said second lever and said indicator, an adjustable contact axis for the other end of said second lever whereby the ratio of the arms of said second lever is adjustable so as to cause said second indicator to rotate at a rate percentually greater than that of said first indicator, said adjustable contact axis being formed by a pinion and means including a threaded member for adjusting the position of said pinion relative to said fulcrum of said second lever.

9. In a device of the class described, in combination, weighing mechanism including an indicator adapted to be rotated by said weighing mechanism, a second indicator mounted coaxially with said first indicator, mechanism for rotating said second indicator in response to movement of said weighing mechanism, said mechanism including a lever fulcrumed at one end, means connecting the other end of said lever to said weighing mechanism, a hanger suspended from said lever, a second lever, a fulcrum for supporting said second lever on said hanger, a rack and pinion connection between one end of said second lever and said indicator and an adjustable contact axis for the other end of said second lever whereby the ratio of the arms of said second lever is adjustable so as to cause said second indicator to rotate at a rate percentually greater than that of said first indicator.

10. In a device of the class described, in combination, weighing mechanism including an indicator adapted to be rotated by said weighing mechanism, a second indicator mounted coaxially with said first indicator, mechanism for rotating said second indicator in response to movement of said weighing mechanism, said mechanism including a lever fulcrumed at one end, means connecting the other end of said lever to said weighing mechanism, a second lever operatively fulcrumed on said first lever, a rack and pinion connection between one end of said second lever and said second indicator and an adjustable contact axis for the other end of said second lever, said rack being pivotally mounted upon said second lever and said second lever and said rack being statically balanced about the axis of such fulcrum of said second lever.

HALVOR O. HEM.